(12) United States Patent
Iguchi et al.

(10) Patent No.: US 10,596,872 B2
(45) Date of Patent: *Mar. 24, 2020

(54) ROCKING CONTROL DEVICE FOR TWO FRONT WHEELS ROCKING VEHICLE

(71) Applicant: HONDA MOTOR CO., LTD., Tokyo (JP)

(72) Inventors: Kazunari Iguchi, Fujimino (JP); Yuichi Uebayashi, Osaka (JP); Tomohiro Kawakami, Saitama (JP); Shunichi Miyagishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 15/715,424

(22) Filed: Sep. 26, 2017

(65) Prior Publication Data

US 2018/0086169 A1 Mar. 29, 2018

(30) Foreign Application Priority Data

Sep. 29, 2016 (JP) ................................. 2016-191066

(51) Int. Cl.
*B60G 17/016* (2006.01)
*B62K 5/08* (2006.01)
*B62K 5/10* (2013.01)
*B62K 5/05* (2013.01)
*B60G 21/00* (2006.01)
(Continued)

(52) U.S. Cl.
CPC ....... *B60G 17/0162* (2013.01); *B60G 21/005* (2013.01); *B62K 5/027* (2013.01); *B62K 5/05* (2013.01); *B62K 5/08* (2013.01); *B62K 5/10* (2013.01); *B62K 25/02* (2013.01)

(58) Field of Classification Search
None
See application file for complete search history.

(56) References Cited

U.S. PATENT DOCUMENTS 5,762,351 A 6/1998 SooHoo
7,591,337 B2 9/2009 Suhre
(Continued)

FOREIGN PATENT DOCUMENTS

CN 103153769 6/2013
EP 1363794 11/2003
(Continued)

OTHER PUBLICATIONS

Japanese Office Action dated Aug. 7, 2018 with English Translation, 6 pages.
(Continued)

*Primary Examiner* — Tamara L Weber
(74) *Attorney, Agent, or Firm* — Rankin, Hill & Clark LLP

(57) ABSTRACT

A rocking control device for a two front wheels rocking vehicle includes a high rigidity self-standing controller that executes a high rigidity self-standing control that locks the rocking of the two front wheels rocking vehicle and that assists a self-standing of the two front wheels rocking vehicle, a switch that switches the high rigidity self-standing control to ON or OFF state, and an offset cancellation controller that executes an offset cancellation control that maintains the self-standing state of the two front wheels rocking vehicle until a predetermined traveling state when the high rigidity self-standing control is switched off.

6 Claims, 6 Drawing Sheets

(51) Int. Cl.
  *B62K 5/027*  (2013.01)
  *B62K 25/02*  (2006.01)

(56) References Cited

U.S. PATENT DOCUMENTS

| | | |
|---|---|---|
| 7,648,148 B1 | 1/2010 | Mercier |
| 8,251,375 B2 | 8/2012 | Hara et al. |
| 2004/0206568 A1 | 10/2004 | Davis |
| 2007/0193803 A1 | 8/2007 | Geiser |
| 2010/0044977 A1 | 2/2010 | Hughes et al. |
| 2011/0060494 A1 | 3/2011 | Tsujii et al. |
| 2012/0181765 A1 | 7/2012 | Hill et al. |
| 2015/0158360 A1 | 6/2015 | Uebayashi |
| 2016/0375948 A1 | 12/2016 | Takenaka |
| 2017/0106930 A1 | 4/2017 | Hara et al. |
| 2018/0086169 A1 | 3/2018 | Iguchi |

FOREIGN PATENT DOCUMENTS

| | | |
|---|---|---|
| EP | 2436586 | 4/2012 |
| JP | 2010-143474 | 7/2010 |
| JP | 2011-025843 | 2/2011 |
| JP | 2011-046294 | 3/2011 |
| JP | 2014-069675 | 4/2014 |
| JP | 2015-123951 | 7/2015 |
| JP | 2015-123959 | 7/2015 |
| JP | 2016-147536 | 8/2016 |
| WO | 02/068228 | 9/2002 |
| WO | 2011/121211 | 10/2011 |
| WO | 2015/146680 | 10/2015 |

OTHER PUBLICATIONS

European Search Report dated Feb. 7, 2018, 7 pages.
European Search Report dated Feb. 6, 2018, 6 pages.
Japanese Notice of Allowance date Jul. 31, 2018, English translation included, 6 pages.
European Notice of Allowance dated Jan. 15, 2020, 83 pages.

ROCKING CONTROL DEVICE FOR TWO FRONT WHEELS ROCKING VEHICLE

CROSS-REFERENCE TO RELATED APPLICATION

Priority is claimed on Japanese Patent Application No. 2016-191066, filed Sep. 29, 2016, the content of which is incorporated herein by reference.

BACKGROUND

Field of the Invention

The present invention relates to a rocking control device for a two front wheels rocking vehicle.

Description of Related Art

In the related art, in a rocking control device for a two front wheels rocking vehicle, a technology of performing rocking assistance according to a vehicle speed is known (for example, Japanese Unexamined Patent Application, First Publication No. 2010-143474).

SUMMARY

Incidentally, in the related art, when control of turning off self-standing control during rocking lock is performed, rocking of a vehicle may occur when self-standing assistance stops abruptly.

An aspect of the present invention is provided to suppress variation in roll posture when self-standing assistance stops in a rocking control device for a two front wheels rocking vehicle.

A rocking control device for a two front wheels rocking vehicle according to the present invention employs the following configurations.

(1) A rocking control device for a two front wheels rocking vehicle according to an aspect of the present invention is a rocking control device for a two front wheels rocking vehicle comprising a pair of left and right front wheels and configured to laterally rock a vehicle body, the rocking control device for a two front wheels rocking vehicle including a high rigidity self-standing controller that executes a high rigidity self-standing control that locks the rocking of the two front wheels rocking vehicle and that assists a self-standing of the two-wheeled rocking vehicle, a switch that switches the high rigidity self-standing control to ON or OFF state and an offset cancellation controller that executes an offset cancellation control that maintains the self-standing state of the two front wheels rocking vehicle until a predetermined traveling state is established when the high rigidity self-standing control is switched off.

According to this above mentioned configuration of (1), when the high rigidity self-standing control is turned off during the high rigidity self-standing control, since self-standing assistance of the high rigidity self-standing control is maintained until a vehicle speed, a distance traveled, and so on, becomes to a predetermined traveling state, variation in roll posture when the high rigidity self-standing control is released can be suppressed.

(2) In the aspect of above mentioned (1), the high rigidity self-standing control may be released when a vehicle speed of the two front wheels rocking vehicle exceeds a predetermined speed.

According to this above mentioned configuration of (2), as the rocking lock is released when the predetermined speed is exceeded, an appropriate rollable driving state can be provided even when the rocking lock is applied on a downhill road or the like.

(3) In the aspect of above mentioned (1) or (2), a self-standing auxiliary spring controller that executes a self-standing auxiliary spring control that applies a restricting force to a rocking of the two front wheels rocking vehicle and that suppresses the rocking of the two front wheels rocking vehicle before reaching the high rigidity self-standing control may be provided.

According to this above mentioned configuration of (3), since the two front wheels rocking vehicle reaches the high rigidity self-standing control via the self-standing auxiliary spring control working in a direction in which the rocking of the two front wheels rocking vehicle is suppressed, self-standing properties can be enhanced while allowing rolling of the vehicle body, and the two front wheels rocking vehicle can be naturally guided toward self-standing.

(4) In the aspect of above mentioned (3), the self-standing auxiliary spring control may strengthen a rocking restricting force according to a decrease of a vehicle speed.

According to this above mentioned configuration of (4), the two front wheels rocking vehicle can be gradually guided to self-standing according to a decrease of the vehicle speed while allowing rolling of the vehicle body.

(5) In the aspect of any one of above mentioned (1) to (4), the offset cancellation control may weaken a rocking restricting force according to an increase of the vehicle speed.

According to this above mentioned configuration of (5), since rolling is allowed gradually according to an increase of the vehicle speed, it is possible to transition to a naturally rollable state while variation during release of the rocking lock is suppressed.

According to the aspects of the present invention, in the rocking control device for a two front wheels rocking vehicle, variation in roll posture when the self-standing assistance is terminated can be suppressed.

DESCRIPTION OF EMBODIMENTS

Figure 1:
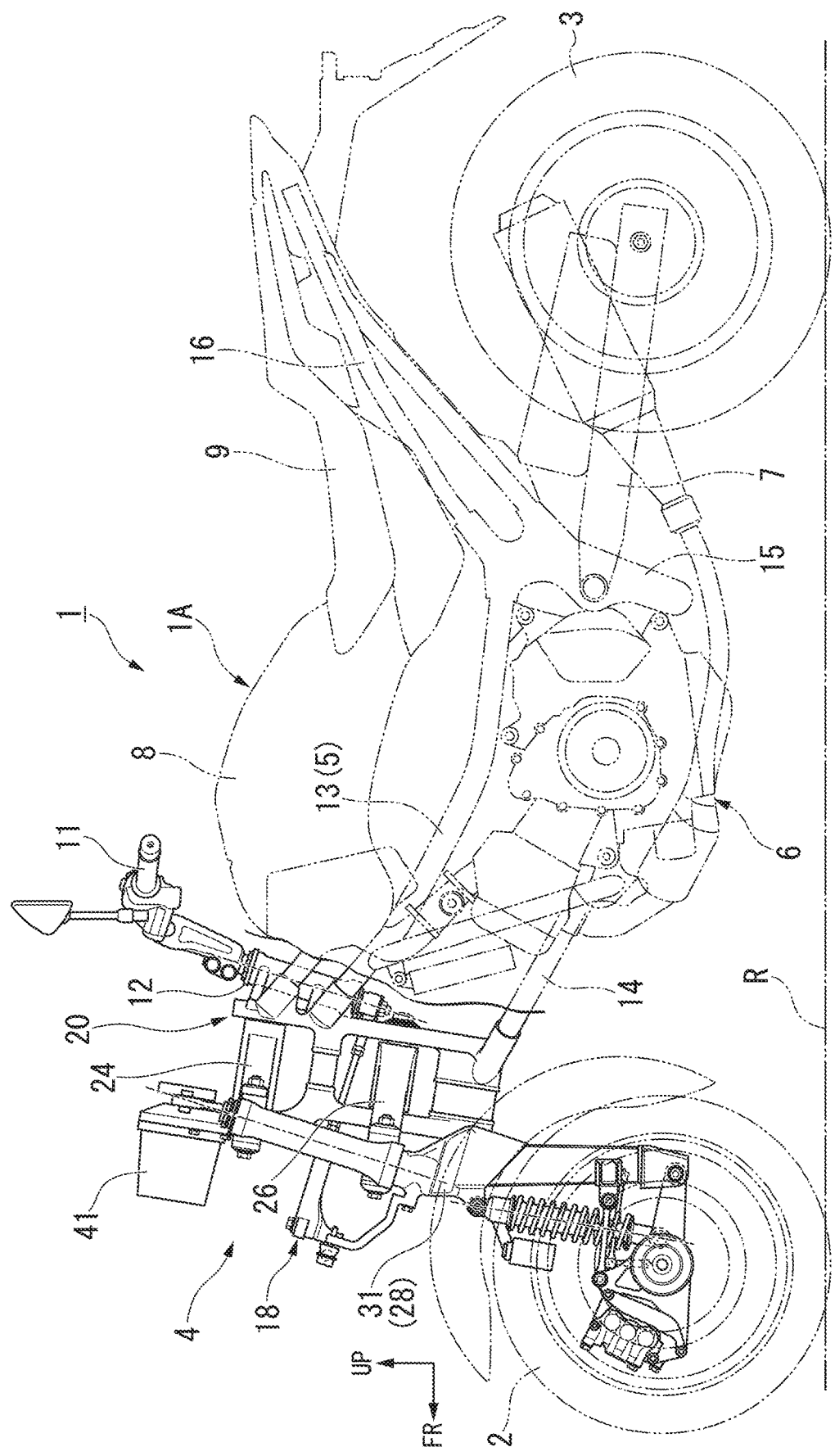
FIG. 1 is a left side view of a two front wheels rocking vehicle according to an embodiment of the present invention.

Hereinafter, an embodiment of the present invention will be described based on the accompanying drawings. Further, directions of forward, rearward, left, right, and so on, described below are the same as directions in a vehicle described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

Figure 2:
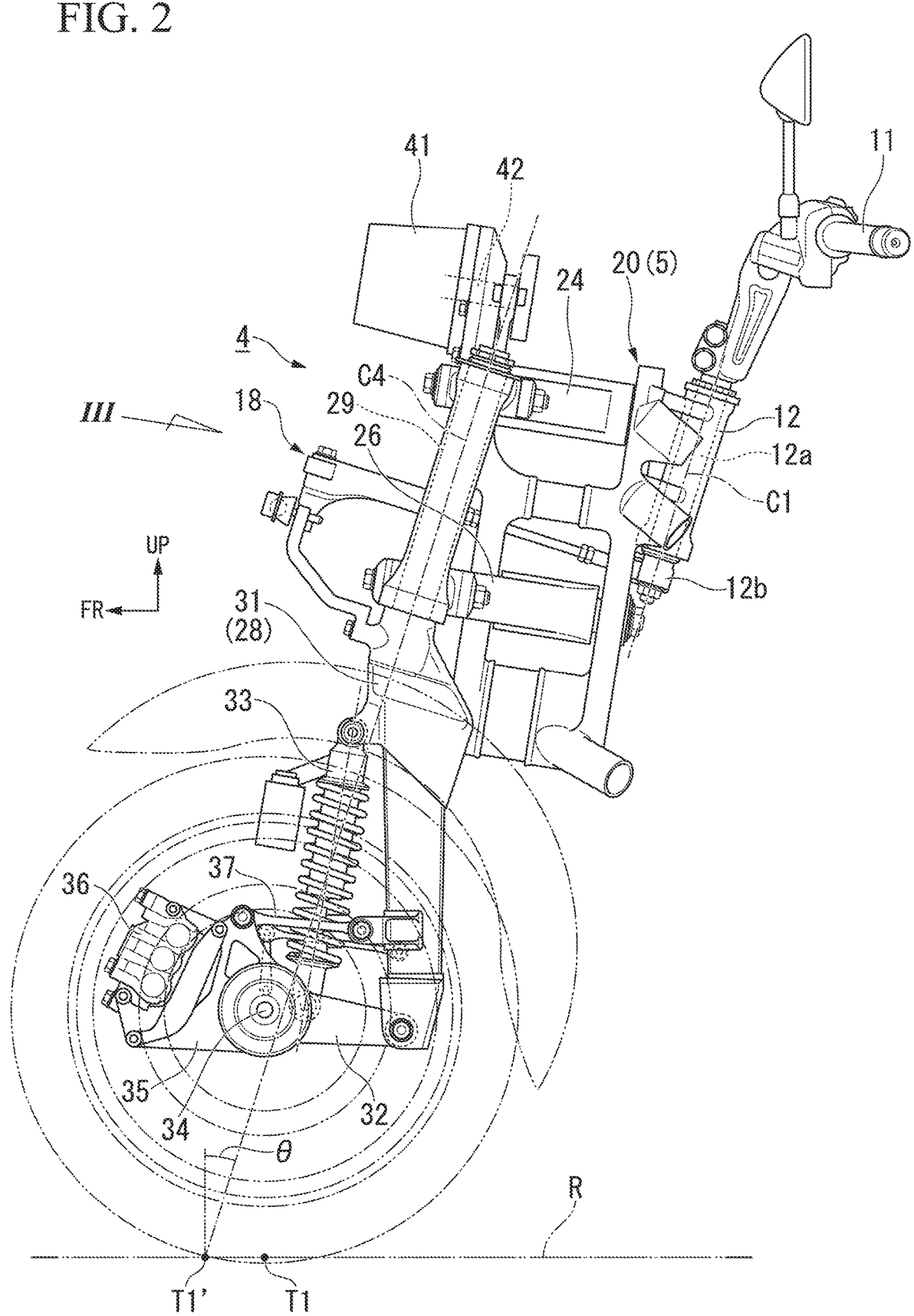
FIG. 2 is a left side view of a two front wheels suspension system of the two front wheels rocking vehicle.
Figure 3:
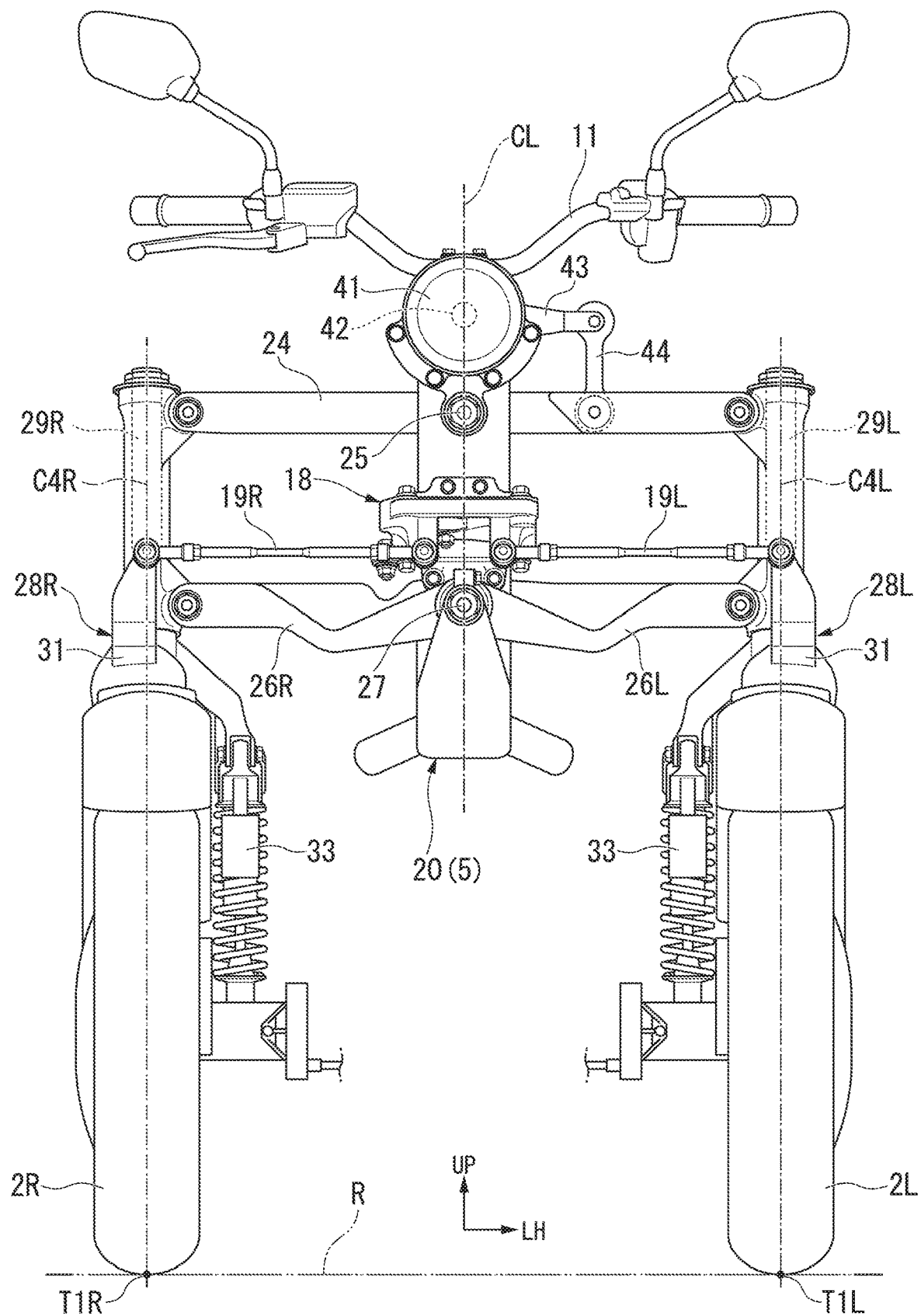
FIG. 3 is a view seen from an arrow III of FIG. 2 (a front view from an axial direction of upper and lower rocking shafts).

As shown in FIG. 1 to FIG. 3, a two front wheels rocking vehicle 1 according to an embodiment is configured as a two front wheels saddle riding type vehicle in which a pair of left and right front wheels (steering wheels) 2L and 2R are laterally symmetrically provided in a front section of a vehicle body, a single rear wheel (a drive wheel) 3 is provided at a center of a rear section of the vehicle body in a leftward/rightward direction, and the vehicle body can be rocked laterally (rolling motion). The two front wheels rocking vehicle 1 has a laterally symmetrical configuration unless the context clearly indicates otherwise. In the embodiment, a pair of left and right components is distinguished by adding the reference character L to the left component and the reference character R to the right component, and only reference numerals from which "L" and "R" are removed may be indicated.

A vehicle body frame 5 of the two front wheels rocking vehicle 1 includes a front suspension frame body 20 configured to support a two front wheels suspension system 4 in a front end portion of the vehicle body frame 5, left and right main frames 13 extending rearward and downward from an upper section of the front suspension frame body 20 while branching off leftward and rightward, left and right down frames 14 extending rearward and downward from a lower section of the front suspension frame body 20 while branching off leftward and rightward, left and right pivot frames 15 extending downward from rear end portions of the left and right main frames 13, and a seat frame 16 extending rearward and upward from upper sections of the left and right pivot frames 15.

An engine (an internal combustion engine) 6 serving as a prime mover of the two front wheels rocking vehicle 1 is mounted below the main frames 13. A rear wheel 3 driven by power from the engine 6 is supported by rear end portions of swing arms 7. Front end portions of the swing arms 7 are vertically swingably supported by the left and right pivot frames 15. A knee grip section 8 sandwiched between both knees of a rider (a driver) is disposed over the engine 6, and an occupant seat 9 is disposed behind the knee grip section 8. The knee grip section 8 is constituted by a fuel tank of the engine 6, an article storage box, or the like.

A head pipe 12 through which a steering shaft 12a is supported is installed on a rear section of the front suspension frame body 20. A bar type steering handle 11 is attached to an upper end portion of the steering shaft 12a protruding upward from the head pipe 12. A bottom bracket 12b to which a steering link mechanism 18 is connected is attached to a lower end portion of the steering shaft 12a protruding downward from the head pipe 12. Left and right front fork units 28 are connected to the steering link mechanism 18 via left and right tie rods 19L and 19R. Line C1 of the drawing represents a central axis (a steering axis) of the head pipe 12 and the steering shaft 12a.

An upper rocking shaft 25 passing through a lateral center of an integrated upper arm 24 in the two front wheels suspension system 4 is supported to the upper section of the front suspension frame body 20. A lower rocking shaft 27 coaxially passing through left and right inner end portions of left and right lower arms 26L and 26R, which are separated at left and right sides, in the two front wheels suspension system 4 is supported to the lower section of the front suspension frame body 20. The upper and lower rocking shafts 25 and 27 are parallel to each other and inclined forward and upward.

The upper arm 24 and left and right lower arms 26 of the two front wheels suspension system 4 extend leftward and rightward in front of the head pipe 12. Upper sections of left and right front fork units 28L and 28R that independently suspend the left and right front wheels 2L and 2R are supported to the upper arm 24 and left and right outer end portions of the left and right lower arms 26 such that they may be steered. The left and right front fork units 28L and 28R can be steered via left and right steering shafts (king pin shafts) 29L and 29R parallel to the head pipe 12 and offset forward and outward from the head pipe 12 when seen in a side view of the vehicle. Reference characters C4L and C4R in the drawing represent central axes (king pin axes) of the left and right steering shafts 29L and 29R.

The two front wheels suspension system 4 can laterally rock a vehicle body main body 1A including the vehicle body frame 5, the engine 6, the rear wheel 3, and so on, while the left and right front wheels 2L and 2R remain in contact with the ground, and can laterally rock the left and right front fork units 28L and 28R and the left and right front wheels 2L and 2R to match the lateral rocking of the vehicle body main body 1A. Here, the two front wheels suspension system 4 alternately vertically moves the left and right front fork units 28L and 28R and the left and right front wheels 2L and 2R with respect to the vehicle body main body 1A. Line CL of the drawing represents a lateral central surface of the vehicle body.

The left and right front fork units 28L and 28R constitute a leading link type front suspension which laterally approaches the inner sides of the left and right front wheels 2L and 2R. The left and right front fork units 28L and 28R include fork main bodies 31 having upper sections supported by the upper arm 24 and left and right outer end portions of the left and right lower arms 26, leading arms 32 having rear end portions that are swingably supported by lower end portions of the fork main bodies 31, cushion units 33 configured to bridge the leading arms 32 and the fork main bodies 31, front wheel axles 34 integrally swingably installed on front end portions of the leading arms 32, caliper brackets 35 swingably supported by the front wheel axles 34 while supporting brake calipers 36 in front of the front wheel axles 34, and torque rods 37 configured to bridge the caliper brackets 35 and the fork main bodies 31 above the front wheel axle 34.

King pin axes C4 of left and right steering shafts 29 are inclined to be disposed further backward as they go upward in a vertical direction when seen in a side view of the vehicle. In other words, left and right king pin axes C4L and C4R are inclined to be parallel to a steering axis C1. The left and right king pin axes C4L and C4R extend in the vertical direction when seen in a front view of the vehicle.

An extension portion extending downward from the king pin axis C4 when seen in a side view of the vehicle reach an intersection point T1' in front of a ground contact point T1 of the front wheel 2 with respect to a road surface R and a predetermined trail amount is generated. An inclined angle $\theta$ of the king pin axis C4 with respect to the vertical direction when seen in a side view of the vehicle is a caster angle. The front wheel axle 34 is offset forward from the extension point of the king pin axis C4 when seen in a side view of the vehicle.

The two front wheels rocking vehicle 1 includes an actuator 41 configured to control lateral rocking (rolling) of the vehicle body.

The actuator 41 has a rotary drive shaft 42 parallel to the upper and lower rocking shafts 25 and 27 of the two front wheels suspension system 4. The actuator 41 fixes a housing that functions as a frame configured to receive and support the rotary drive shaft 42 to a portion of the front suspension frame body 20 above the upper rocking shaft 25. The actuator 41 is an electric motor or a fluidic device configured to generate a torque in the rotary drive shaft 42, and integrally supports a rocking arm 43 on the rotary drive shaft 42. A portion of the upper arm 24 offset from the upper rocking shaft 25 toward one of left and right sides is connected to the rocking arm 43 via a connecting link 44. The upper and lower rocking shafts of the connecting link 44 and an area that connects the rotary drive shaft 42 and the upper rocking shaft 25 form a parallel link when seen in a side view of the vehicle, the upper arm 24 is rocked according to a rotation angle of the rotary drive shaft 42, and thus, rolling of the vehicle body is controlled.

Next, roll control (lateral rocking control) of the two front wheels rocking vehicle 1 will be described.

Figure 4:
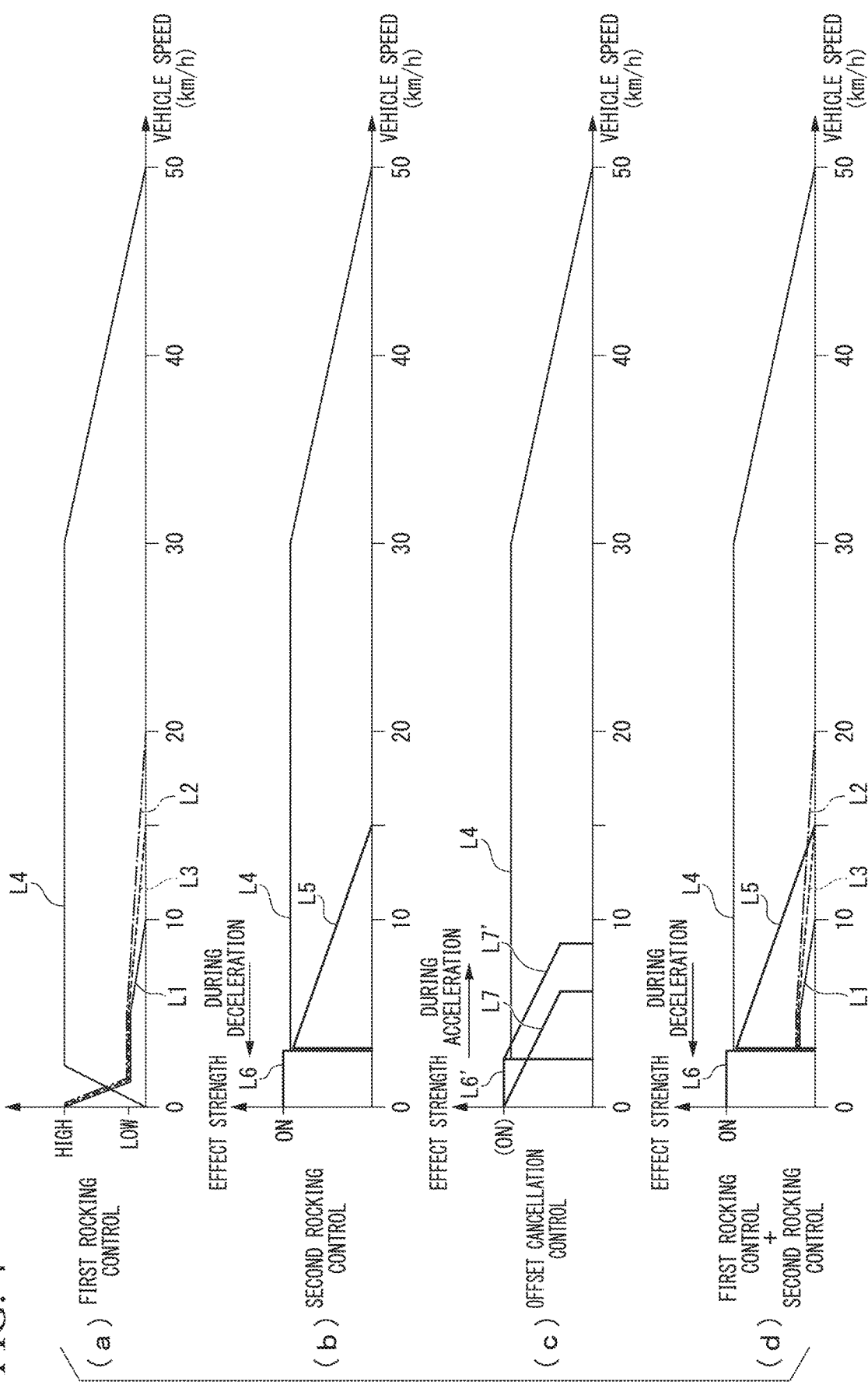
FIG. 4 shows graphs showing roll control of the two front wheels rocking vehicle, part (a) shows first rocking control, and parts (b) to (d) show second rocking control.

As shown in FIG. 4, roll control of the two front wheels rocking vehicle 1 is generally classified as first rocking control (self-standing OFF control, part (a) of FIG. 4) of assisting a roll operation of a rider, and second rocking control (self-standing ON control, parts (b) to (d) of FIG. 4) allowing self-standing a vehicle body without support by a driver during stoppage.

Referring to part (a) of FIG. 4, the first rocking control includes weight shift roll assist control L1 and dual effect roll damper control L2 performed during stoppage and reducing an effect strength shortly after the start of traveling, and steering roll assist control L4 and single effect roll damper control L3 that are not performed during stoppage and increasing an effect strength instead of a decrease of the effect strength of the weight shift roll assist control L1 and the dual effect roll damper control L2.

The first rocking control can be turned on/off by a first rocking control switch (not shown) attached to a handle, a vehicle body, or the like, and it is needless to say that the form of the switch is not limited.

The first rocking control and the second rocking control can be caused to operate in combination, and when the first rocking control and the second rocking control are turned on together, in a predetermined speed range in which self-standing auxiliary spring control L5 works, each of the weight shift roll assist control L1, the dual effect roll damper control L2, the single effect roll damper control L3 and the steering roll assist control L4 also works in the same way.

Figure 5:
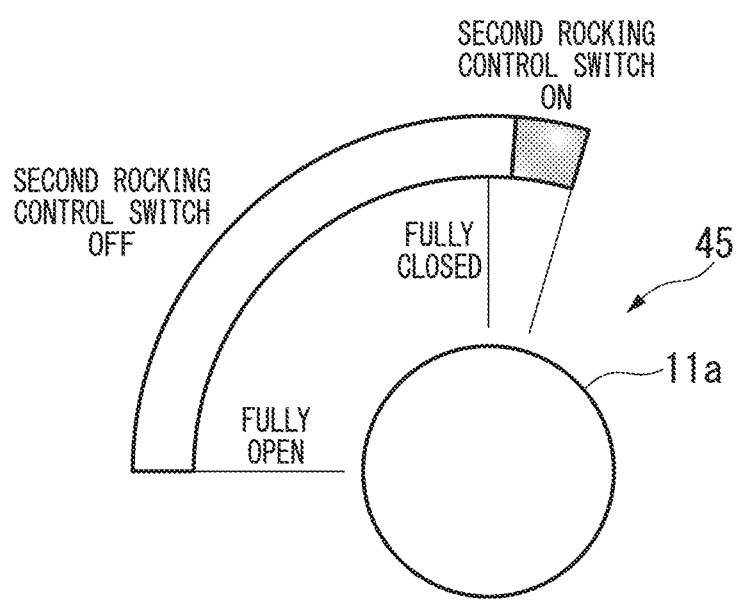
FIG. 5 is a view for describing a second rocking control switch of the two front wheels rocking vehicle.

Referring to FIG. 4(b), FIG. 4(d) and FIG. 5, the second rocking control is performed when a second rocking control switch (a self-standing ON/OFF switch) 45 is turned on and when it has become to a predetermined traveling state such as a vehicle speed is below a predetermined value. For example, when a throttle grip 11a is used as an operating piece, the second rocking control switch 45 of the embodiment is turned off (OFF) from a fully closed position of the throttle grip 11a (a throttle fully closed position) toward an operation range in a throttle opening direction, and is turned on (ON) when over-stroked further from the fully closed position in the throttle closing direction. That is, a throttle is fully closed when the second rocking control switch 45 is turned on.

The second rocking control includes the self-standing auxiliary spring control L5 in which the effect strength is gradually increased as a vehicle speed is decreased from a time point when the vehicle speed has reached a low speed (for example, 15 km/h) during deceleration when the second rocking control switch 45 is turned on, and high rigidity self-standing control L6 in which the effect strength is increased to a predetermined value from a time point when the vehicle speed has reached an ultra low speed (for example, 3 km/h) until the stoppage of the vehicle during deceleration when the second rocking control switch 45 is turned on.

The self-standing auxiliary spring control L5 overlaps with the steering roll assist control L4. In a speed range exceeding a predetermined speed of the self-standing auxiliary spring control L5, the steering roll assist control L4 is continued even when the second rocking control switch 45 is turned on. Here, the weight shift roll assist control L1, the dual effect roll damper control L2 and the single effect roll damper control L3 are also continued.

In the high rigidity self-standing control L6, various roll moments applied to the vehicle body are suppressed by a control system. That is, in the high rigidity self-standing control L6, it is possible to lock the rocking of the two front wheels rocking vehicle 1 and to assist the rocking of the two front wheels rocking vehicle 1 to self-stand. For this reason, when the high rigidity self-standing is released, the various roll moments cannot be suppressed simultaneously. Here, in the second rocking control, offset cancellation control L7 (see part (c) of FIG. 4) that stores a rocking torque instruction value during the high rigidity self-standing and that applies the same rocking torque at the time of releasing the self-standing in order to gradually decrease the rocking torque is performed.

Referring to part (c) of FIG. 4, the offset cancellation control L7 gradually reduces a rocking restricting force according to an increase in vehicle speed, and terminates at a time point, for example, when the vehicle has traveled a predetermined distance (for example, 9 m) after starting the control. The offset cancellation control L7 outputs a value of "0" until a predetermined storage condition is input.

Here, the high rigidity self-standing control L6 maintains the high rigidity self-standing until the vehicle speed has reached a predetermined speed (for example, 3 km/h) even when the vehicle travels while the second rocking control switch 45 is not turned off (line L6' in the drawing) and releases the high rigidity self-standing when the vehicle speed exceeds the predetermined speed. The high rigidity self-standing control L6 is released when a vehicle speed of the two front wheels rocking vehicle exceeds a predetermined speed. Also at this time, the offset cancellation control L7 outputs a stored value by using the release of the high rigidity self-standing as a trigger (line L7' in the drawing). In addition, when the previously stored value is lowered, a new value is not input until the next storage condition is satisfied. The offset cancellation control L7 maintains the self-standing state of the two front wheels rocking vehicle 1 until a predetermined traveling state is established when the high rigidity self-standing control L6 is switched off.

Next, a control block of the two front wheels rocking vehicle 1 will be described.

Figure 6:
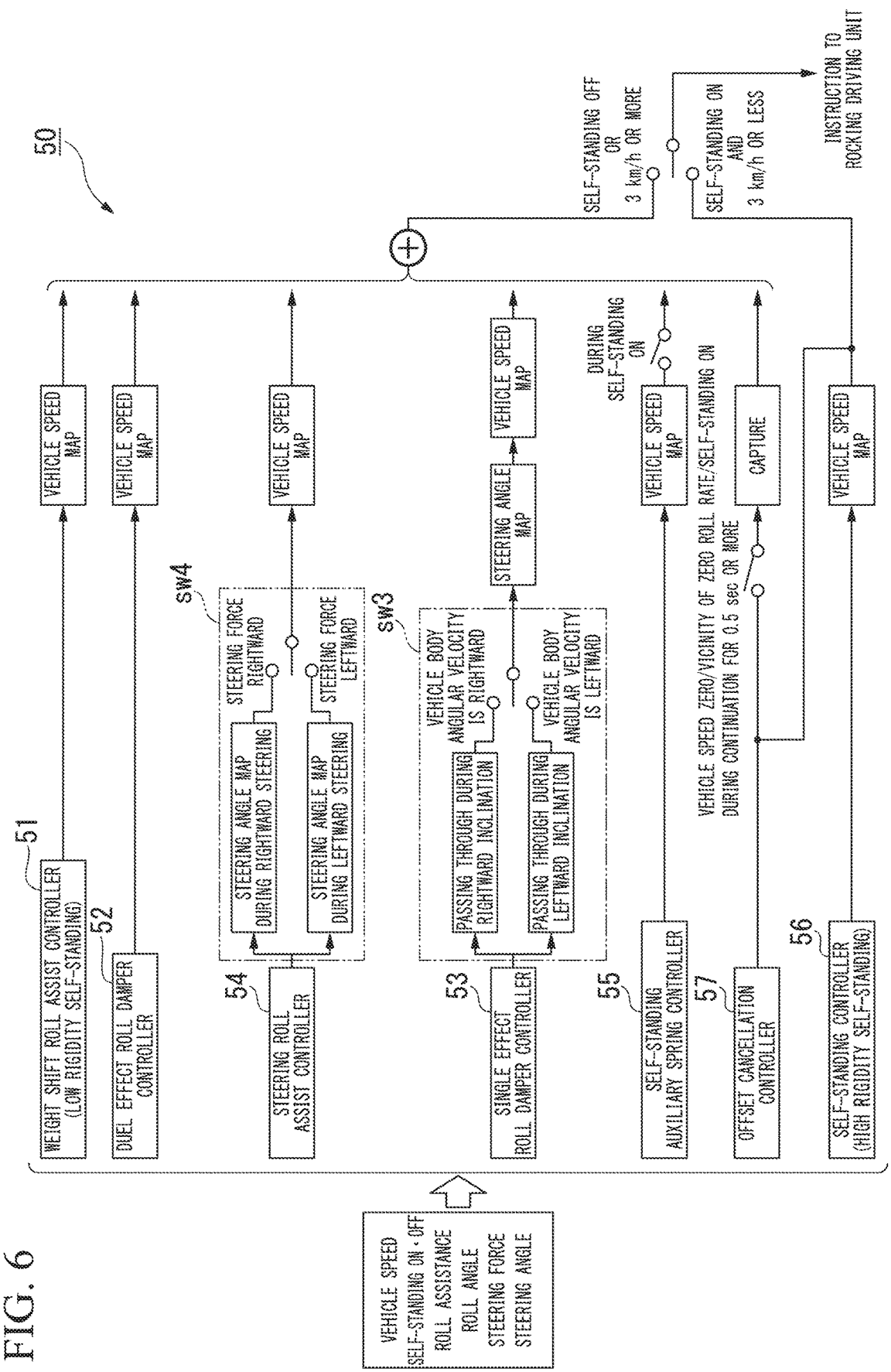
FIG. 6 is a schematic diagram for describing a control block of the two front wheels rocking vehicle.

As shown in FIG. 6, various information such as a vehicle speed, on/off of the second rocking control switch 45, a roll rate (an angular velocity), a roll angle, a steering force and a steering angle is input to a rocking control ECU 50. A weight shift roll assist controller 51, a dual effect roll damper controller 52, a steering roll assist controller 54, a single effect roll damper controller 53, a self-standing auxiliary spring controller 55, a high rigidity self-standing controller 56 and an offset cancellation controller 57 are installed in the rocking control ECU 50.

In the weight shift roll assist controller 51, a state in which a weight shift of a rider can be balanced during stoppage, i.e., a state in which inclination of the vehicle body follows the weight shift of the rider is created, and a transition from stoppage to traveling can be performed without stepping the ground with a foot (the weight shift roll assist control L1).

In the weight shift roll assist control L1, a weight shift amount (calculated by a rocking torque, a roll rate, a roll angle, a steering angle and a vehicle speed) and a vehicle speed are input information. The rocking torque is detected by, for example, a torque sensor installed in the vicinity of the upper and lower rocking shafts 25 and 27 in the two front wheels suspension system 4, the roll rate and the roll angle are detected by, for example, a gyro sensor installed on the vehicle body, the steering angle and the steering force are detected by, for example, a steering angle/steering force sensor installed in the vicinity of the steering shaft 12a, and the vehicle speed is detected by, for example, a vehicle speed sensor installed in the vicinity of the front wheel axle 34.

In the weight shift roll assist control L1, a rocking torque in proportion to an estimated roll moment value due to a weight shift of a rider is instructed. In actuality, the weight shift itself is not instructed, and a total value (an estimated weight shift amount and an estimated external force moment) of the moment applied to the vehicle body other than from the rocking unit is estimated, and an instruction value (a weight shift roll assist instruction value) of the rocking torque is output based on the estimated total value. The output value refers to a map in which the effect strength is set according to a vehicle speed. In the embodiment, each of the controllers has a similar map.

Further, in consideration of a roll angle with respect to a rocking reference position, when an instruction value of the rocking torque is a value indicating an output of the rocking torque toward a side at which the vehicle body is tilted toward the ground, a rocking torque instruction value is fixed to zero. That is, the rocking torque is only output toward a side that the vehicle body is raised, and rolling to the side where the vehicle body is tilted toward the ground is not assisted. Specifically, when the vehicle body rolls rightward from the rocking reference position and the weight shift is directed rightward or when the vehicle body rolls leftward from the rocking reference position and the weight shift is directed leftward, the rocking torque instruction value is set to zero. Since the torque toward the side where the vehicle body is tilted toward the ground is fixed to zero, even when input of a torque toward the side where the vehicle body is tilted toward the ground is caused due to a reaction with respect to the weight shift in order to raise the vehicle body, the influence with respect to an operation of raising the vehicle body is suppressed.

An assistance force of the first rocking control is not applied in a direction in which the vehicle body is tilted toward the ground from the rocking reference position and is applied only in a direction in which the vehicle body is raised toward the reference position. The rocking reference position is a rocking position at which a vertical axis (an axis in the vertical direction) coincides with a vehicle body lateral central surface CL during stoppage, and is a rocking position at which an inclined axis inclined with respect to the vertical axis by a predetermined angle in the steering direction coincides with the vehicle body lateral central surface CL when the vehicle travels with a steering angle (during turns). The rocking reference position during turning is determined based on a rocking reference position map in which a steering angle and a vehicle speed are used as parameters. The rocking reference position is a rocking balanced position at which rocking moments of the vehicle body are canceled out in the lateral direction.

For example, when a leftward steering angle is applied, the front wheels 2L and 2R are inclined leftward from setting of the caster angle and the trail amount, and the vehicle body and the rider will start moving leftward with respect to the ground contact points T1L and T1R of the front wheels 2L and 2R. With respect to this, the rider will naturally move rightward in order to balance in a self-standing state. Provided that a self-standing rocking angle obtained as a result of this movement of the rider is a balance reference angle, in the embodiment, a rocking angle less than the balance reference angle is set as a dead zone for the weight shift roll assist control L1.

In the weight shift roll assist control L1, there is a case where the reaction may be delayed. In addition, since the rocking torque instruction rises after the weight shift of the rider has terminated, there is a case where the reaction may be delayed after the operation. In addition, since the torque is merely applied to the vehicle body rolling, it is necessary to provide an element configured to stop the rolling after the rolling starts to proceed. For these reasons, it is preferable to use the weight shift roll assist control L1 together with the dual effect roll damper control L2.

In the dual effect roll damper controller 52, traveling stability is increased by improving the stability of rolling (the dual effect roll damper control L2). In the dual effect roll damper control L2, the roll rate and the vehicle speed are input information. In the dual effect roll damper control L2, as a rocking torque (a damping torque) of reverse polarity is instructed in proportion to the roll rate, a behavior of viscous friction is reproduced.

In the single effect roll damper controller 53, wobbling is reduced by making tilting of the vehicle body gentle during, in particular, low speed turning (the single effect roll damper control L3). In the single effect roll damper control L3, the roll rate, the roll angle, the vehicle speed and the steering angle are input information. In the single effect roll damper control L3, like the dual effect roll damper control L2, as a rocking torque (a damping torque) of reverse polarity is instructed in proportion to the roll rate, a behavior of the viscous friction is reproduced. In the single effect roll damper control L3, a torque resisting against the side at which the vehicle body is tilted toward the ground is generated, but a control which interferes with the side at which the vehicle body is raised is not performed.

For example, when the vehicle is traveling in a rightward inclination state, the vehicle body angular velocity is rightward, and when the vehicle is traveling in a leftward inclination state, the vehicle body angular velocity is leftward. Accordingly, a switching circuit sw3 determines whether the vehicle body angular velocity is rightward or leftward.

In the steering roll assist controller 54, a roll reaction with respect to the steering (a reaction of rolling in a direction opposite to the steering direction) is created by a motor torque (the steering roll assist control L4). For this reason, roll controllability can be maintained up to a low speed range in which normally a counter steering becomes not effective, and it is possible to keep the vehicle body rocking under a rider's control. However, since a rider's discomfort is increased when the steering roll assist control L4 is performed at a vehicle speed of zero, the weight shift roll assistance is performed when the vehicle speed is about zero instead of the steering roll assistance.

In the steering roll assist control L4, the steering force and the steering angle are input information.

In the steering roll assist control L4, a rocking torque in a direction opposite to the steering force direction (a left roll torque when a steering force is in a rightward direction, and a right roll torque when a steering force is in a leftward direction) is instructed in proportion to the steering force. The instruction value is increased or decreased according to the steering angle, a proportional coefficient is decreased in the vicinity of traveling in a straight line, and a proportional coefficient is increased as the steering angle is increased.

The second rocking control switch 45 transmits a balancing intention of a rider to a control system. That is, when self-standing is released with only conditions such as a vehicle speed or the like, the rider's balancing may not be in time. With respect to this, by making the rider to indicate the rider's intention through the second rocking control switch 45, it is possible to make the rider to prepare for balancing and suppress the delay for starting the balancing.

In addition, since the second rocking control switch 45 has the throttle grip 11a serving as an operating part, it is not necessary for a rider to change the position of the hand for handling, and the vehicle can be started immediately after release of self-standing. In addition, the rider's self-standing intention can be transmitted to the control system in a series of the accelerator OFF operation during stoppage. In addition, operations during driving are also easy, and ON/OFF of the second rocking control can be directly controlled according to the rider's intention.

In the self-standing auxiliary spring controller 55, the vehicle body is guided to a vertical standing state (a standing state in the vertical direction) in preparation for self-standing during stoppage while allowing rolling at a low speed before the stoppage (the self-standing auxiliary spring control L5). The self-standing auxiliary spring controller (55) executes a self-standing auxiliary spring control (L5) that applies a restricting force to a rocking of the two front wheels rocking vehicle (1) and that suppresses the rocking of the two front wheels rocking vehicle (1) before reaching the high rigidity self-standing control (L6). In the self-standing auxiliary spring control L5, the roll angle and the vehicle speed are input information. In the self-standing auxiliary spring control L5, a rocking torque with a reverse polarity in proportion to the roll angle is instructed. In addition, the self-standing auxiliary spring control L5 works when the second rocking control switch 45 is turned on. The self-standing auxiliary spring control L5 strengthens a rocking restricting force according to a decrease of a vehicle speed.

In the high rigidity self-standing controller 56, a necessity for a rider to support the vehicle body during stoppage is eliminated (the high rigidity self-standing control L6). In the high rigidity self-standing control L6, the roll angle, the roll rate and the vehicle speed are input information. In the high rigidity self-standing control L6, regardless of a center of gravity of the vehicle body and the rider, a rocking torque is instructed such that a geometric center of the vehicle body is disposed on a vertical axis. The high rigidity self-standing control L6 is positioning control having a positioning (roll angle) loop and a speed (roll rate) loop, and has the same effect as a combination of a rigid roll damper and a rigid roll spring.

In the offset cancellation controller 57, the rocking torque instruction value, the roll rate and the vehicle speed are input information. In the offset cancellation control L7, in a state in which the second rocking control switch 45 is turned on, the roll rate is about zero and a vehicle speed of zero continues for 0.5 sec or more, the switching circuit is closed, and memory update with respect to a capture of a rocking torque instruction value is started. When the second rocking control switch 45 is turned off, the memory update is canceled and the stored instruction value is added to the instructed torque. The stored instruction value is decreased along with, for example, the traveling of the vehicle, and is made zero after a predetermined distance has been traveled (about 9 m). In addition, when the second rocking control switch 45 is turned off, an offset value (bias) is set to 0 and added to the instructed torque.

The stored rocking torque instruction value includes all influences related to the roll moment such as a cant gradient at that time, an offset of the rocking torque, a stepping state of the rider using a foot, a center of gravity of a rider, a steering angle (a ground contact position), and so on.

Next, operations will be described.

When only the first rocking control switch is turned on, while the weight shift roll assist control L1 and the dual effect roll damper control L2 reduce the effect strength shortly after the start of traveling, the weight shift roll assist control L1 maintains the effect continuing during low speed traveling. Accordingly, even when the vehicle body is inclined and the rider uses a foot during low speed traveling, raising the vehicle body by the rider with the usage of the foot can be assisted by the weight shift roll assist control L1. The weight shift roll assist control L1 is continued to about 10 km/h, the single effect roll damper control L3 is continued to about 15 km/h, and the dual effect roll damper control L2 is continued to about 20 km/h.

In addition, after the vehicle has started traveling, the steering roll assist control L4 raises the effect strength thereof so as to replace the weight shift roll assist control L1 or the like. Accordingly, it is possible to make the vehicle body rocking under the rider's control while maintaining the roll controllability obtained by the steering.

In the intermediate speed range of about 30 to 50 km/h, the steering roll assist control L4 gradually reduces the effect strength thereof according to an increase in vehicle speed, and the effect strength is set to 0 at about 50 km/h.

Further, in the vehicle speed range in which the high rigidity self-standing control L6 and the self-standing auxiliary spring control L5 are not started, there is no difference whether the second rocking control switch 45 is in the ON or OFF state, and it is possible to roll the vehicle body even when the second rocking control switch 45 is turned on.

Meanwhile, when the throttle is fully closed and the second rocking control switch 45 is turned on, the self-standing auxiliary spring control L5 is started from a time point when the vehicle speed reaches the low speed range (about 15 km/h or less). The self-standing auxiliary spring control L5 gradually increases the effect strength (rocking restricting force) from the low speed range to the ultra low speed range (about 3 km/h or less). Accordingly, wobbling at a low speed can be reduced during deceleration while allowing rolling of the vehicle body, and it is possible to establish both the self-standing during stoppage and the controllability similar to a two-wheeled vehicle.

When reaching the ultra low speed range, the high rigidity self-standing control L6 is started instead of the self-standing auxiliary spring control L5. Accordingly, self-standing of the vehicle can be performed before stoppage. Therefore, since the high rigidity self-standing control L6 is continued with the self-standing auxiliary spring control L5, it is possible to easily and securely stop the two front wheels rocking vehicle 1 in a self-standing state.

In addition, during restarting from the high rigidity self-standing, even when various roll moments (due to a load, luggage, or the like) are applied to the vehicle body, since the rocking torque during the high rigidity self-standing is maintained by the offset cancellation control L7, it is possible to reduce the wobbling during release of the self-standing.

As described above, the rocking control device for the two front wheels rocking vehicle 1 according to the embodiment includes a high rigidity self-standing controller 56 that executes a high rigidity self-standing control L6 that locks the rocking of the two front wheels rocking vehicle 1 and that assists a self-standing of the two-wheeled rocking vehicle 1, a switch that switches the high rigidity self-standing control L6 to ON or OFF state, and an offset cancellation controller 57 that executes an offset cancellation control L7 that maintains the self-standing state of the two front wheels rocking vehicle 1 until a predetermined traveling state is established when the high rigidity self-standing control is switched off.

According to this configuration, when the high rigidity self-standing control L6 is turned off during the high rigidity self-standing control L6, since self-standing assistance of the high rigidity self-standing control L6 is maintained until a vehicle speed, a distance traveled, and so on, becomes to a predetermined traveling state, variation in roll posture when the high rigidity self-standing control L6 is released can be suppressed.

In addition, in the rocking control device for the two front wheels rocking vehicle 1 according to the embodiment, the high rigidity self-standing control L6 is released when a vehicle speed of the two front wheels rocking vehicle 1 exceeds a predetermined speed.

According to this configuration, as the rocking lock is released when the predetermined speed is exceeded, an appropriate rollable driving state can be provided even when the rocking lock is applied on a downhill road or the like.

In addition, in the rocking control device for the two front wheels rocking vehicle 1 according to the embodiment, a self-standing auxiliary spring controller 55 that executes a self-standing auxiliary spring control L5 that applies a restricting force to a rocking of the two front wheels rocking vehicle 1 and that suppresses the rocking of the two front wheels rocking vehicle 1 before reaching the high rigidity self-standing control L6 is provided.

According to this configuration, since the two front wheels rocking vehicle 1 reaches the high rigidity self-standing control L6 via the self-standing auxiliary spring control L5 working in a direction in which the rocking of the two front wheels rocking vehicle 1 is suppressed, self-standing properties can be enhanced while allowing rolling of the vehicle body, and the two front wheels rocking vehicle 1 can be naturally guided toward self-standing.

In addition, in the rocking control device for the two front wheels rocking vehicle 1 according to the embodiment, the self-standing auxiliary spring control L5 strengthens a rocking restricting force according to a decrease of a vehicle speed.

According to this configuration, the two front wheels rocking vehicle 1 can be gradually guided to self-standing according to a decrease of the vehicle speed while allowing rolling of the vehicle body.

In addition, in the rocking control device for the two front wheels rocking vehicle 1 according to the embodiment, the offset cancellation control L7 weakens a rocking restricting force according to an increase of the vehicle speed.

According to this configuration, since rolling is allowed gradually according to an increase of the vehicle speed, it is possible to transition to a naturally rollable state while variation during release of the rocking lock is suppressed.

Further, the present invention is not limited to the embodiment and, for example, the two front wheels rocking vehicle is not limited to a three-wheeled vehicle having two front wheels and a single rear wheel and also includes a four-wheeled vehicle having two front wheels and two rear wheels. While the offset cancellation control maintains a rocking restricting force until reaching a predetermined distance traveled after control starts, the rocking restricting force may be maintained until a vehicle speed exceeds a predetermined value. Similarly, the self-standing auxiliary spring control may be configured to weaken the rocking restricting force according to a vehicle speed rather than a distance traveled.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A rocking control device for a two front wheels rocking vehicle having a pair of left and right front wheels and configured to laterally rock a vehicle body, the rocking control device for the two front wheels rocking vehicle comprising:
   an actuator that executes a first rocking control that assists a roll operation of a rider of the two front wheels rocking vehicle and a second rocking control that allows a self-standing of the two front wheels rocking vehicle without support by the rider during stoppage of the two front wheels rocking vehicle,
   a high rigidity self-standing controller that executes a high rigidity self-standing control that locks the rocking of the two front wheels rocking vehicle and that assists the self-standing of the two front wheels rocking vehicle,
   a switch that switches the second rocking control and the high rigidity self-standing control to ON or OFF state, and
   an offset cancellation controller that executes an offset cancellation control that maintains the self-standing state of the two front wheels rocking vehicle until a predetermined traveling state is established when the high rigidity self-standing control is switched off,
   wherein the switch uses a throttle grip of the two front wheels rocking vehicle as an operating part so that the switch is operated by operation of the throttle grip.

2. The rocking control device for the two front wheels rocking vehicle according to claim 1, wherein the high rigidity self-standing control is switched off when a vehicle speed of the two front wheels rocking vehicle exceeds a predetermined speed.

3. The rocking control device for the two front wheels rocking vehicle according to claim 1, further comprising a self-standing auxiliary spring controller that executes a self-standing auxiliary spring control that applies a restricting force to a rocking of the two front wheels rocking vehicle that suppresses the rocking of the two front wheels rocking vehicle before reaching the high rigidity self-standing control.

4. The rocking control device for the two front wheels rocking vehicle according to claim 3, wherein the self-standing auxiliary spring control strengthens a rocking restricting force according to a decrease of a vehicle speed.

5. The rocking control device for the two front wheels rocking vehicle according to claim 1, wherein the offset cancellation control weakens a rocking restricting force according to an increase of a vehicle speed.

6. The rocking control device for the two front wheels rocking vehicle according to claim 1, wherein the second rocking control and the high rigidity self-standing control are switched to the OFF state by the switch when the throttle grip as the operating part of the switch is rotated between fully closed and fully opened positions, and the second rocking control and the high rigidity self-standing control are switched to the ON state when the throttle grip as the operating part of the switch is over-stroked past the fully closed position.

* * * * *